US007047859B2

(12) United States Patent
Ide et al.

(10) Patent No.: US 7,047,859 B2
(45) Date of Patent: May 23, 2006

(54) OPTICAL RECORDING MEDIUM-MANUFACTURING APPARATUS

(75) Inventors: Junichi Ide, Tokyo (JP); Takeshi Umega, Tokyo (JP); Haruhiko Yamaguchi, Tokyo (JP); Futoshi Kobayashi, Tokyo (JP); Tsuyoshi Itoh, Tokyo (JP); Yoshimi Yodogawa, Tokyo (JP); Mamoru Usami, Tokyo (JP)

(73) Assignee: TDK Corporation, Tokyo (JP)

( * ) Notice: Subject to any disclaimer, the term of this patent is extended or adjusted under 35 U.S.C. 154(b) by 219 days.

(21) Appl. No.: 10/786,005

(22) Filed: Feb. 26, 2004

(65) Prior Publication Data

US 2004/0168559 A1    Sep. 2, 2004

(30) Foreign Application Priority Data

Feb. 28, 2003 (JP) ............................. 2003-053742

(51) Int. Cl.
   *G11B 7/26* (2006.01)
   *B26D 7/01* (2006.01)
   *B26D 5/08* (2006.01)

(52) U.S. Cl. .............................. 83/621; 83/51; 83/863; 83/956; 264/442; 264/155

(58) Field of Classification Search ................ 83/621, 83/863, 170, 98, 862, 15, 16, 701, 956, 51; 264/407, 442, 402, 403, 404, 40.5, 154, 155; 219/606, 607; 29/603.03; 261/21; 156/73.3, 156/252, 253, 73.1
   See application file for complete search history.

(56) References Cited

U.S. PATENT DOCUMENTS 6,740,181 B1 * 5/2004 Lim ........................ 156/73.3

FOREIGN PATENT DOCUMENTS

| DE | 1245109 | * | 4/1961 |
| JP | 58-175630 | * | 4/1982 |
| JP | 2003-059124 | | 2/2003 |
| JP | 2004-118880 | | 4/2004 |

OTHER PUBLICATIONS

English Language Abstract of JP 2002-276491 which was published on Apr. 15, 2004.

* cited by examiner

*Primary Examiner*—Allan N. Shoap
*Assistant Examiner*—Edward Landrum
(74) *Attorney, Agent, or Firm*—Greenblum & Bernstein, P.L.C.

(57) ABSTRACT

An optical recording medium-manufacturing apparatus which is capable of reducing wear of a cut-forming blade section used for forming a cut in a resin layer, without increasing the component costs of the apparatus. An ultrasonic horn includes a hollow-cylindrical cut-forming blade section for being pushed into a resin layer formed on one side of a disk-shaped substrate, thereby forming a circular cut in the resin layer. A control section controls motion of the ultrasonic horn caused by a moving mechanism. The control section causes the ultrasonic horn to be pushed in to the resin layer while causing ultrasonic vibration thereof to thereby form the cut, and while maintaining a state of ultrasonic vibration of the abutment section and a pushed-in state of the cut-forming blade section, causes the punching blade section to be pushed into the disk-shaped substrate, to form the central hole.

6 Claims, 6 Drawing Sheets

OPTICAL RECORDING MEDIUM-MANUFACTURING APPARATUS

BACKGROUND OF THE INVENTION

1. Field of the Invention

The present invention relates to an optical recording medium-manufacturing apparatus that manufactures an optical recording medium by punching a central hole through a disk-shaped substrate.

2. Description of the Related Art

In general, when an optical recording medium (optical disk), such as a Blu-ray Disc (BD), is manufactured, a thin film, such as a light-reflecting layer, is formed on a disk-shaped substrate having grooves and lands formed in a surface thereof by injection molding, and then a resin layer (light transmission layer) having a thickness of approximately 100 µm is formed on the thin film by the spin-coating method such that the resin layer covers the thin film. In the Blu-ray Disc, a construction is employed in which a laser beam emitted e.g. from a playback apparatus transmits through the resin layer. Consequently, if the optical recording media thus manufactured has variation in the film thickness of the resin layer thereof, it is difficult to normally reproduce recorded data. Therefore, in the formation of a resin layer, it is necessary to spin-coat the entire surface of a substrate with a resin material for forming a resin layer, to a uniform thickness. In this case, to form a resin layer having a uniform thickness on a substrate by the spin-coating method, it is preferable to drop a resin material onto the center of a substrate being rotated. To this end, there has been proposed a method of manufacturing an optical recording medium by dropping a resin material onto the center of a substrate before forming a central hole for clamping, which is required in reproduction of recorded data e.g. by a playback apparatus, to thereby form a resin layer having a uniform thickness, inserting a hollow-cylindrical punching blade section from the reverse side of the substrate, and then punching the central hole such that the central hole extends through the substrate and the resin layer.

However, this optical recording medium-manufacturing method suffers from the problem that due to vertical motions of the punching blade section during punching of the central hole, the resin layer or the substrate through the central hole 1 is to be formed is not clearly punched out, but the rim of the central hole suffers from peeling or burring of the resin layer. To form a uniform resin layer while overcoming this problem, the present assignee has proposed in Japanese Patent Application No. 2002-276491, an optical recording medium-manufacturing apparatus (hereinafter also referred to as the "manufacturing apparatus") which manufactures an optical recording medium by forming a cut in a resin layer before pushing a punching blade section into the resin layer, and then pushing the punching blade section from the reverse side of a substrate while causing ultrasonic vibration of the punching blade section, to thereby form a central hole by punching.

In this manufacturing apparatus, first, a cut is formed in the resin layer formed on one or front surface of the substrate. More specifically, in a state of a retaining jig being in abutment with the other or reverse surface of the substrate, another retaining jig formed with a cut-forming blade section having a height slightly larger than the thickness of the resin layer is moved downward toward the resin layer to thereby push the cut-forming blade section into the resin layer. Thus, the cut is formed in the resin layer. Then, a central hole is formed by punching. More specifically, the punching blade section is caused to move upward from the reverse side of the substrate while causing ultrasonic vibration of the punching blade section by ultrasonic waves generated by a ultrasonic generator. In this case, a portion of the substrate in contact with the punching blade section is softened due to heat generated by ultrasonic vibration of the punching blade section, so that the punching blade section is smoothly pushed into the substrate. As a result, the wear of the cutting edge of the punching blade section is reduced.

Next, when the punching blade section is further moved upward and the cutting edge of the punching blade section reaches the front surface of the substrate, the punching of the substrate is completed to form the central hole. This completes the optical recording medium. In this case, since the cut has been formed in the resin layer by the cut-forming blade section, when the cutting edge of the punching blade section reaches the one or front surface of the substrate, a portion of the substrate inward of the cut is clearly cut off along the cut by the force of moving the punching blade section upward. As a result, it is possible to prevent the rim of the central hole from suffering from peeling or burring of the resin layer.

However, from the study of the proposed manufacturing apparatus, the present inventors found out the following points for improvement: In the proposed manufacturing apparatus, a cut is formed by pushing the cut-forming blade section of the retaining jig into the resin layer. The resin layer has a sufficient hardness for protection of a light reflection layer or a recording layer, and at the same time, a relative large thickness of approximately 100 µm, so that the cutting edge of the cut-forming blade section sometimes wears out in a relatively short time period. If the cut-forming blade section having the worn cutting edge is used, it is difficult to form a cut having a sufficient depth for ensuring prevention of peeling or burring of the resin layer. Therefore, it is necessary to replace a cut-forming blade section frequently (e.g. every 5000 to 10000 times of cutting operation). Therefore, this manufacturing apparatus can cause an increase in manufacturing costs owing to replacement of lots of cut-forming blade sections and lowered manufacturing efficiency caused by frequent replacing operations. This inconvenience is desired to be eliminated. To this end, it can be contemplated to provide separately from the above-mentioned ultrasonic generator, an additional ultrasonic generator for causing ultrasonic vibration of the cut-forming blade section, and cause the cut-forming blade section to be pushed into the resin layer while causing the additional ultrasonic generator to cause the ultrasonic vibration of the cut-forming blade section. This method, however, requires provision of two ultrasonic generators which are very expensive, causing an increase in the component costs of the manufacturing apparatus. This makes the method difficult to employ.

SUMMARY OF THE INVENTION

The present invention has been made to solve the above described problems, and a main object thereof is to provide an optical recording medium-manufacturing apparatus which is capable of reducing wear of a cut-forming blade section used for forming a cut in a resin layer, without increasing the component costs of the apparatus.

To attain the above object, the present invention provides an optical recording medium-manufacturing apparatus, comprising an abutment section including a cut-forming blade section that has a hollow cylindrical shape and is pushed into a resin layer formed on one side of a disk-shaped substrate, thereby forming a circular cut in the resin layer, a punching blade section including a cutting edge that is pushed into the disk-shaped substrate, for punching a central hole smaller in diameter than the circular cut, through the disk-shaped substrate, a moving mechanism that moves the abutment section in directions toward and away from the cutting edge of the punching blade section, a control section that controls motion of the abutment section caused by the moving mechanism, and an ultrasonic generator that causes ultrasonic vibration of the abutment section, wherein the control section causes the moving mechanism to move the abutment section while causing the ultrasonic generator to cause ultrasonic vibration of the abutment section, in an approaching direction toward the cutting edge of the punching blade section, to thereby cause the cut-forming blade section to be pushed into the resin layer to form the circular cut, and while maintaining a state of the ultrasonic vibration of the abutment section and a pushed-in state of the cut-forming blade section, cause the punching blade section to be pushed into the disk-shaped substrate from the other side of the disk-shaped substrate to form the central hole.

With the arrangement of the optical recording medium-manufacturing apparatus according to the present invention, a cut is formed by pushing the cut-forming blade section into the light transmission layer, while causing ultrasonic vibration of the cut-forming blade section, and the punching blade section is pushed into the disk-shaped substrate, while maintaining ultrasonic vibrating state of the abutment section and pushed-in state of the cut-forming bladed section, whereby a central hole is punched. This makes it possible to soften a portion of the light transmission layer in contact with the cut-forming blade section by heat generated by the ultrasonic vibration, when a cut is formed in the light transmission layer. Therefore, the cut-forming blade section can be smoothly pushed into the light transmission layer, whereby it is possible to sufficiently reduce the wear of the cut-forming blade section. As a result, even when the cut-forming blade section is used over the long time, it is possible to continue reliably forming a cut having a sufficient depth.

Further, when a central hole is punched through the disk-shaped substrate, ultrasonic waves can be transmitted to the disk-shaped substrate by way of the abutment section. Therefore, a portion of the disk-shaped substrate in contact with the punching blade section can be softened by heat generated by the ultrasonic vibration, which enable the punching blade section to be smoothly pushed into the disk-shaped substrate. As a result, the wear of the punching blade section can be sufficiently reduced. Further, the punching blade section and the cut-forming blade section can be smoothly pushed by ultrasonic vibration using one ultrasonic generator without providing expensive ultrasonic generators separately for the punching blade section and the cut-forming blade section, which makes it possible to sufficiently reduce the wear of the two blade sections without increasing the component costs of the optical recording medium-manufacturing apparatus.

Preferably, the abutment section has an indentation circular in plan view formed in a surface thereof which is brought into contact with the resin layer when the cut-forming blade section is placed in the pushed-in state, at a location inward of a location where the cut-forming blade section is arranged. With this arrangement of the preferred embodiment, when the cutting edge of the cut-forming blade section is pushed into the light transmission layer, part of the light transmission layer and part of the disk-shaped substrate opposed to the cut can be maintained in a non-adhered state, which makes it possible to clearly separate this portion of the resin layer from the disk-shaped substrate, when a punched part punched off by the punching blade section is cleanly separated.

Preferably, the optical recording medium-manufacturing apparatus include a positioning protrusion disposed in a central portion of the punching blade section in a state slidable in the directions toward and away from the cutting edge of the punching blade section, and a first urging device urging the positioning protrusion toward the abutment section, and the positioning protrusion has a foremost end thereof protruded toward the abutment section with respect to the cutting edge of the punching blade section, and is capable of being fitted in a positioning hole formed in a central portion of the disk-shaped substrate, the moving mechanism causing the abutment section to move in the approaching direction, thereby causing the positioning protrusion fitted in the positioning hole to move together with the disk-shaped substrate in the approaching direction, to cause the punching blade section to be pushed into the disk-shaped substrate. With this arrangement of the preferred embodiment, it is possible to bring the disk-shaped substrate into abutment with the punching blade section with the center of the disk-shaped substrate and that of the punching blade section being aligned. This makes it possible reliably prevent the central hole from being formed off-center.

Preferably, the optical recording medium-manufacturing apparatus includes a substrate-receiving table having an insertion hole formed in a central portion thereof for inserting the punching blade section, and a second urging device that urges the substrate-receiving table toward the abutment section such that normally, a surface of the substrate-receiving table for being brought into contact with the disk-shaped substrate is positioned toward the abutment section with respect to the cutting edge of the punching blade section, and the moving mechanism causes the abutment section to move in the approaching direction to cause the substrate-receiving table to move in the approaching direction together with the disk-shaped substrate, thereby causing the punching blade section to be pushed into the disk-shaped substrate, the substrate-receiving table allowing the disk-shaped substrate to move in the approaching direction when the disk-shaped substrate is pressed by the moving mechanism. With this arrangement of the preferred embodiment, normally, when the cutting edge of the punching blade section is not protruded from the surface where the disk-shaped substrate is brought into contact, which makes it possible to prevent an operator from being injured by an accidental or careless touch of his hand on the cutting edge of the punching blade section, and prevent the punching blade section from being broken owing to contact with other tools. Further, the substrate-receiving table causes e.g. the translating motion of the disk-shaped substrate, whereby it is possible to prevent the disk-shaped substrate from being inclined when the central hole is punched. This makes it possible to form the central hole which is perpendicular to the horizontal surface of the disk-shaped substrate.

Preferably, the optical recording medium-manufacturing apparatus includes a substrate-holding device that attracts a part of the disk-shaped substrate outward of a location where the central hole is to be formed to hold the disk-shaped substrate thereat, and a punched piece-holding device that holds a punched piece which has been punched off by the punching blade section. With this arrangement of the preferred embodiment, it is possible to prevent the optical recording medium from being moved in accordance with the upward motion of the abutment section when a punched piece is separated off the disk-shaped substrate.

Preferably, the ultrasonic generator causes longitudinal vibration of the abutment section. With this arrangement of the preferred embodiment, differently from the construction in which the abutment section is subjected to simple harmonic motion horizontally or along the plane of the disk-shaped substrate, neither the cut-forming blade section nor the disk-shaped substrate is horizontally shifted, so that it is possible to form a cut and punch a central, with the center of the disk-shaped substrate, that of the cut-forming blade section, and that of the punching blade section being aligned. This makes it possible to reliably prevent a cut and a central hole from being formed off-center.

It should be noted that the present disclosure relates to the subject matter included in Japanese Patent Application No. 2003-053742 filed on Feb. 28, 2003, and it is apparent that all the disclosures therein are incorporated herein by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

The invention will now be described in detail with reference to the accompanying drawings showing a preferred embodiment thereof.

First, a description will be given of the arrangement of an optical recording medium-manufacturing apparatus according to the present invention and the construction of an optical recording medium.

Figure 1:
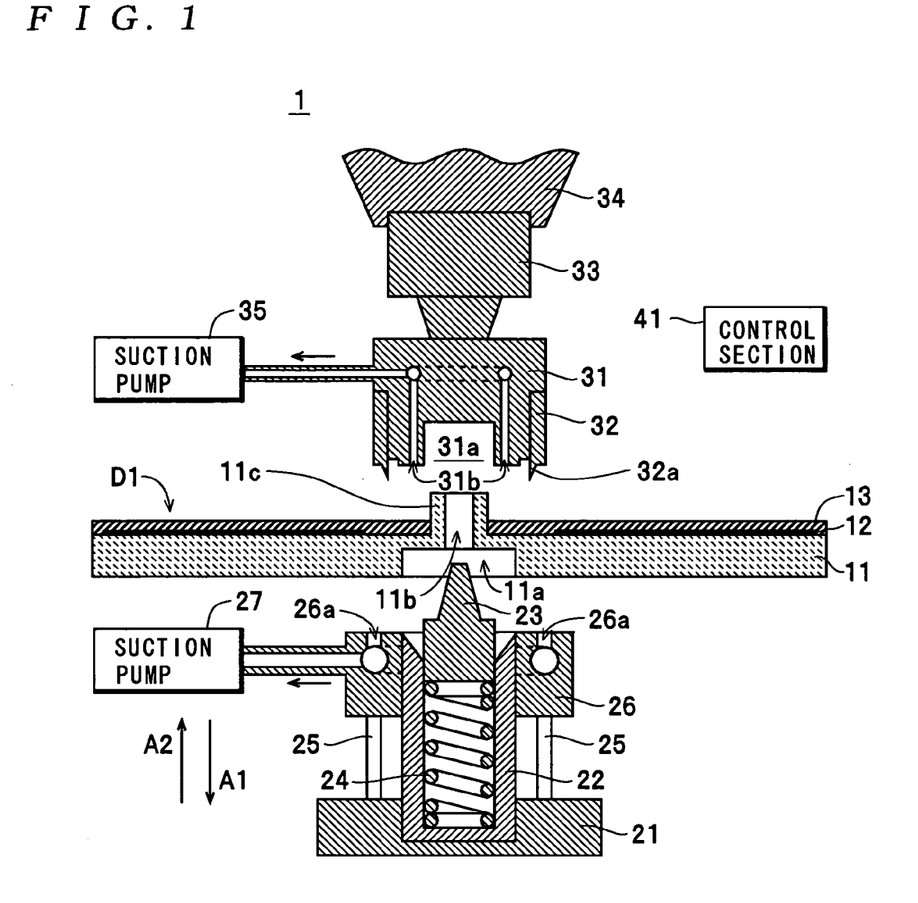
FIG. 1 is a cross-sectional view showing the arrangement of a manufacturing apparatus according to an embodiment of the present invention.
Figure 2:
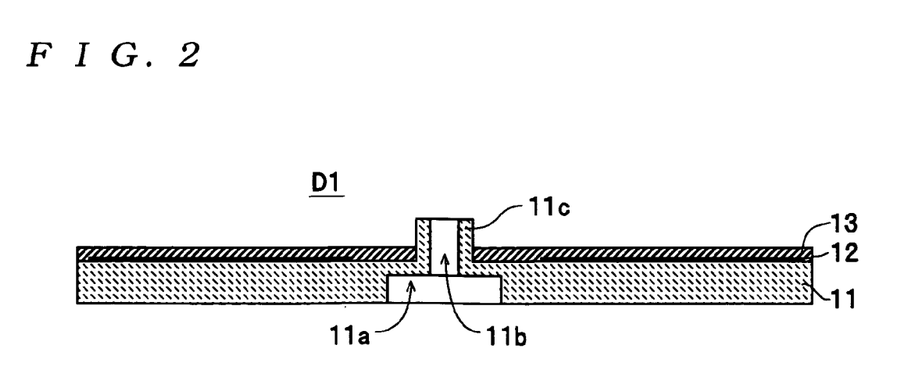
FIG. 2 is a cross-sectional view of a disk-shaped substrate before a cut and a central hole are formed therein.

A manufacturing apparatus 1 shown in FIG. 1 corresponds to the optical recording medium-manufacturing apparatus according to the present invention, and manufactures an optical recording medium D2 (see FIG. 3) by forming a cut 13a (see FIG. 6) in a light transmission layer 13 of a disk-shaped substrate D1, and then punching a central hole 14 (see FIG. 8) therethrough. In this embodiment, as shown in FIG. 2, the disk-shaped substrate D1 is comprised of a substrate 11 in the form of a disk, thin films 12, such as a light-reflecting layer and a recording layer, sequentially formed on one or upper surface of the substrate 11, and the light transmission layer (resin layer in the present invention) 13 formed to cover the thin films 12.

The substrate 11 is molded by injecting a resin material, such as a polycarbonate, prior to preparation of the disk-shaped substrate D1. In the present embodiment, the other or lower surface of the substrate 11 has a central portion formed with a recess 11a whose bottom surface is to be punched afterwards for formation of the central hole 14. In the illustrated example, the recess 11a is formed to have an inner diameter of 15.06 mm, approximately equal (equivalent) to the diameter of the central hole 14. Further, in the upper surface of the substrate 11, there are formed grooves and lands by injection molding, and a hollow cylindrical protrusion 11c formed with a positioning hole 11b for positioning the disk-shaped substrate D1 with respect to the manufacturing apparatus 1 when the cut 13a and the central hole 14 are formed. In the present embodiment, the positioning hole 11b is formed such that it has a diameter of e.g. 5 mm, and the center thereof is aligned with the center of the recess 11a.

Figure 3:
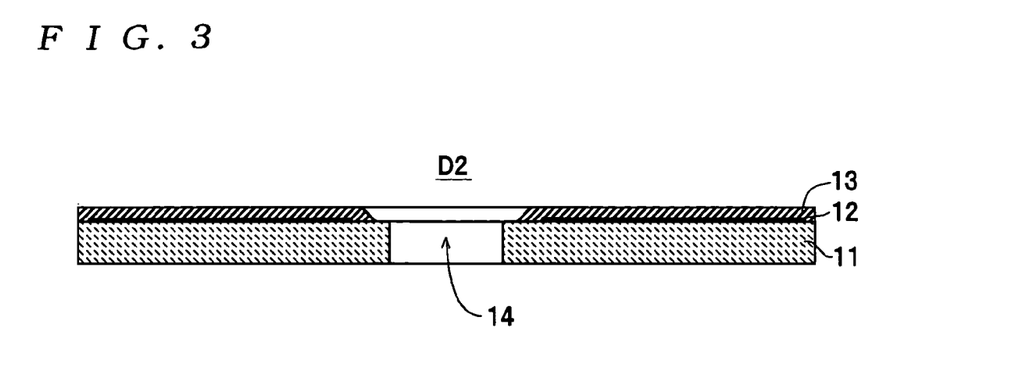
FIG. 3 is a cross-sectional view of an optical recording medium produced by the manufacturing apparatus.

The light transmission layer 13 is a resin layer for protecting the thin films 12 formed on the substrate 11 and allowing transmission of a laser beam therethrough during reproduction of recorded data. For example, the light transmission layer 13 is formed by coating an ultraviolet-curing resin material by the spin-coating method, and formed to have a thickness of approximately 100 μm. Further, as shown in FIG. 3, the optical recording medium D2 is constructed by forming the central hole 14 having a diameter of approximately 15 mm through the central portion of the disk-shaped substrate D1. It should be noted that for ease of understanding of the present invention or simplicity, description of the construction of the thin films 12, etc. and the method of forming the same is omitted.

As shown in FIG. 1, the manufacturing apparatus 1 is comprised of a base 21, a punching blade section 22, a positioning protrusion 23, a spring 24, air cylinders 25, 25, . . . , a substrate-receiving table 26, an ultrasonic horn 31, a cut-forming blade section 32, an ultrasonic generator 33, a moving mechanism 34, and a control section 41. The punching blade section 22 is, as shown in FIG. 1, in the form of a bottomed hollow cylinder with an outer shape having an outer diameter of 15.04 mm, approximately equal to the inner diameter of the central hole 14, and rigidly fixed to the base 21. The punching blade section 22 is pushed into the disk-shaped substrate D1 pushed downward by the moving mechanism 34, to thereby punch the central hole 14 through the disk-shaped substrate D1. The positioning protrusion 23 in the form of a truncated conical shape is disposed within the punching blade section 22, and urged upward by the spring 24 (example of a first urging device in the present invention) such that the positioning protrusion 23 is fitted into the positioning hole 11b of the disk-shaped substrate D1, for positioning the disk-shaped substrate D1 with respect to the punching blade section 22.

The air cylinders 25 are an example of a second urging device in the present invention, and when the disk-shaped substrate D1 is moved downward, e.g. compressed air is supplied to an air chamber formed within the substrate-receiving table 26 by a pressure pump, not shown, whereby the air cylinders 25 allow the translating motion of the substrate-receiving table 26 in a direction indicated by an arrow A1 (in a downward direction), whereas when the disk-shaped substrate D1 is moved upward, compressed air is supplied to an air chamber formed within the base 21 by the pressure pump, whereby the air cylinders 25 allow the translating motion of the substrate-receiving table 26 in a direction indicated by an arrow A2 (in an upward direction). The substrate-receiving table 26 has a generally hollow cylindrical shape and is mounted to the base 21 via the air cylinders 25, 25 . . . such that the substrate-receiving table 26 can be moved upward and downward along the side surface of the punching blade section 22. The substrate-receiving table 26 has an upper surface thereof formed flat such that it can be brought into surface contact with the lower surface of the disk-shaped substrate D1. Further, the substrate-receiving table 26 is formed with a plurality of suction holes 26$a$, 26$a$, . . . for attracting the disk-shaped substrate D1 thereto by sucking air between the upper surface of the substrate-receiving table 26 and the lower surface of the disk-shaped substrate D1. The suction holes 26$a$, 26$a$, . . . communicate with the suction pump 27 via communication holes. The suction pump 27 and the suction holes 26$a$, 26$a$, . . . form a substrate-holding device in the present invention. It should be noted that the position of the substrate-receiving table 26 in the direction of height thereof is defined such that normally, i.e. when the ultrasonic horn 31 has not been moved downward, a cutting edge of the punching blade section 22 does not protrude from the upper surface of the substrate-receiving table 26, as shown in FIG. 1. Further, when the disk-shaped substrate D1 is pressed by the moving mechanism 34, the substrate-receiving table 26 permits the motion of disk-shaped substrate D1 in an approaching direction toward the cutting edge of the punching blade section 22 by the operation of the air cylinders 25.

Figure 8:
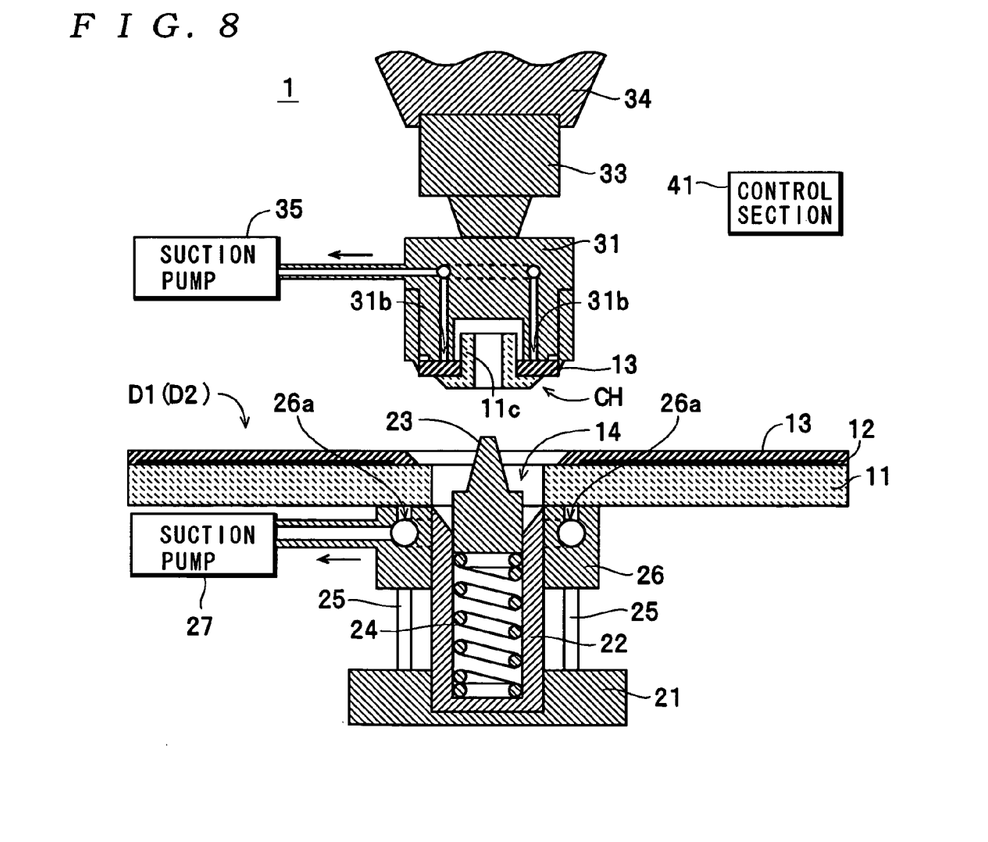
FIG. 8 is a cross-sectional view of the manufacturing apparatus and the disk-shaped substrate in a state where a punched piece is separated from the disk-shaped substrate.
Figure 9:
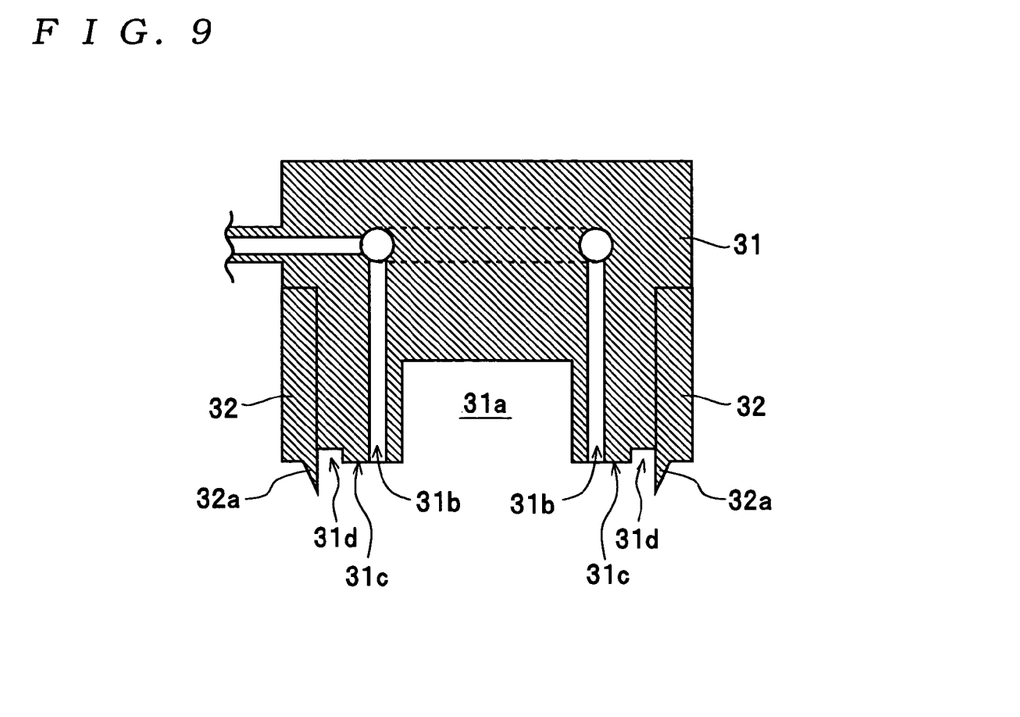
FIG. 9 is a cross-sectional view showing the arrangement of an ultrasonic horn and the cut-forming blade section.

The ultrasonic horn 31 corresponds to the abutment section of the invention and, as shown in FIGS. 1 and 9, has a generally hollow cylindrical shape. The ultrasonic horn 31 is mounted on the moving mechanism 34 together with the ultrasonic generator 33, and is moved in vertical directions (directions toward and away from the cutting edge of the punching blade section 22). In this case, the ultrasonic horn 31 transmits ultrasonic waves generated by the ultrasonic generator 33 to the cut-forming blade section 32. Further, when the central hole 14 is formed, the ultrasonic horn 31 is brought into abutment with the light transmission layer 13 of the disk-shaped substrate D1 and transmits ultrasonic waves to the disk-shaped substrate D1. The ultrasonic horn 31 has a lower end face (abutment surface) 31$c$ thereof formed with a recess 31$a$ into which the protrusion 11$c$ of the disk-shaped substrate D1 can be inserted. Furthermore, the ultrasonic horn 31 is formed with a plurality of suction holes 31$b$, 31$b$, . . . for sucking air around the protrusion 11$c$ of a punched piece CH (see FIG. 8) punched off by the punching blade section 22 (air on the upper surface of the light transmission layer 13 of the punched piece CH) to thereby attract the punched piece CH thereto. The suction holes 31$b$, 31$b$, . . . communicate with the suction pump 35 via communication holes. The suction pump 35 and the suction holes 31$b$, 31$b$, . . . form a punched piece-holding device in the present invention. Further, the ultrasonic horn 31 is formed with a cutaway portion 31$d$ (indentation in the present invention) circular in plan view is formed at an outer periphery of the lower end face 31$c$ (inward of location where the cut-forming blade section 32 is disposed) as shown in FIG. 9.

The cut-forming blade section 32 has a generally hollow cylindrical shape, as shown in FIG. 9, and is removably mounted (disposed) on the outer periphery of an ultrasonic horn 31. Further, a blade 32$a$ having an annular shape is formed on the foremost end (lower end face in FIG. 9) of the cut-forming blade section 32, for forming a cut 13$a$ in the light transmission layer 13 of the disk-shaped substrate D1. The blade 32$a$ is a single-sided blade having a cutting blade formed on an outer periphery thereof, and the diameter of the cutting edge is approximately 16 mm, which is larger than the diameter of the central hole 14. Further, the height of the blade 32$a$ (length of protrusion from the lower end face 31$c$ of the ultrasonic horn 31) is defined to be approximately 105 μm, which is equivalent (approximately equal) to the thickness (e.g. approximately 100 μm) of the light transmission layer 13, according to the depth of the cut 13$a$ to be formed in the light transmission layer 13. When the cut 13$a$ is formed, the cut-forming blade section 32 is pushed into the light transmission layer 13 according to the movement of the ultrasonic horn 31 while being vertically vibrated by the ultrasonic waves generated by the ultrasonic generator 33 and transmitted via the ultrasonic horn 31. The blade 32$a$ is not necessarily limited to a single-edged blade but may be configured to be a double-sided blade having cutting blades formed on both of the inner and outer peripheries thereof.

The ultrasonic generator 33 generates ultrasonic waves under the control of the control section 41 to cause vertical vibration of the ultrasonic horn 31. The moving mechanism 34 moves the ultrasonic generator 33 and the ultrasonic horn 31 upward and downward under the control of the control section 41. The control section 41 controls the supply of compressed air to the air cylinders 25 by the pressure pump, not shown, suction of air by the suction pumps 27 and 35, and generation of ultrasonic waves by the ultrasonic generator 33. Further, the control section 41 controls the motions of the ultrasonic generator 33 and the ultrasonic horn 31 by the moving mechanism 34.

Next, a method of manufacturing the optical recording media D2 by the manufacturing apparatus 1 will be described with reference to drawings. It is assumed here that the manufacturing of the disk-shaped substrate D1 (injection molding of the substrate 11, and formation of the thin films 12 and the light transmission layer 13 on the upper surface of the substrate 11) has already been completed.

Figure 4:
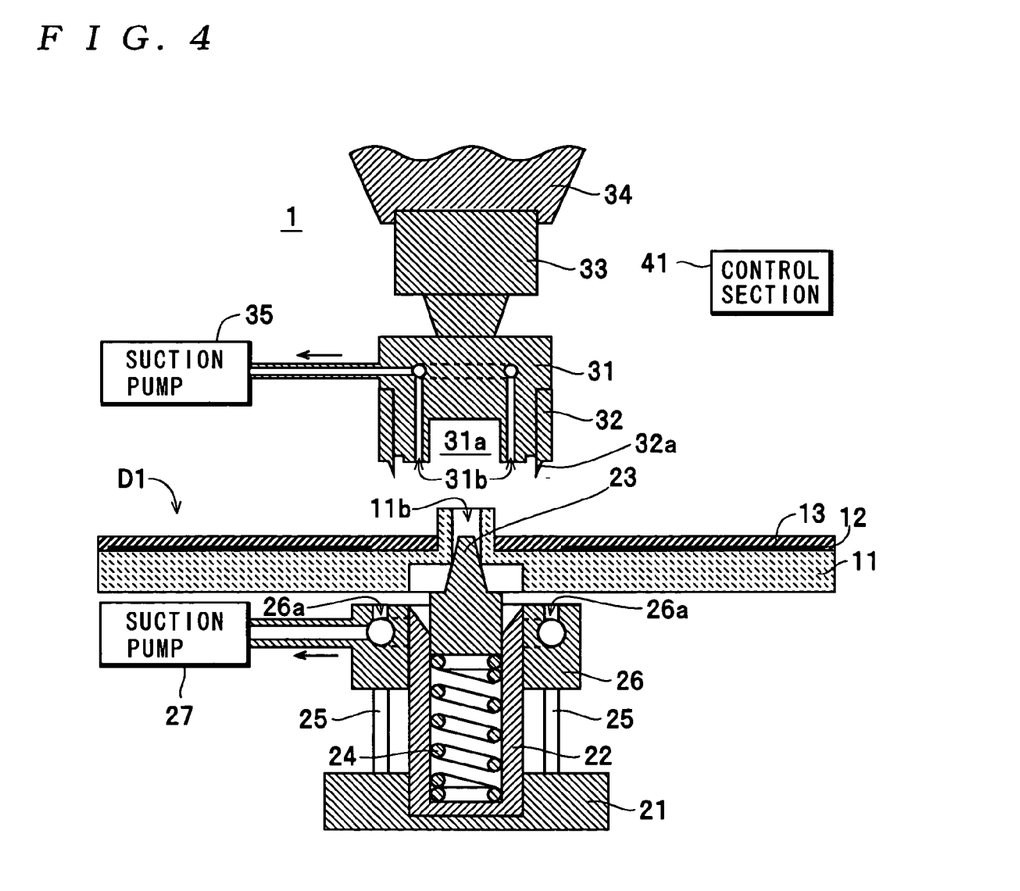
FIG. 4 is a cross-sectional view of the manufacturing apparatus and the disk-shaped substrate in a state where a positioning protrusion is fitted in a positioning hole.

First, as shown in FIG. 4, the positioning hole 11$b$ of the disk-shaped substrate D1 is fitted on the foremost end of the positioning protrusion 23. In this case, the center of the disk-shaped substrate D1 and the center of the punching blade section 22 are made substantially aligned. Next, the control section 41 causes the moving mechanism 34 to move downward the ultrasonic generator 33 and the ultrasonic horn 31 toward disk-shaped substrate D1. In doing this, the blade 32$a$ of the cut-forming blade section 32 is brought into abutment with the light transmission layer 13, and in this state, the ultrasonic horn 31 is further moved downward, whereby the spring 24 is compressed and the disk-shaped substrate D is moved downward.

Figure 5:
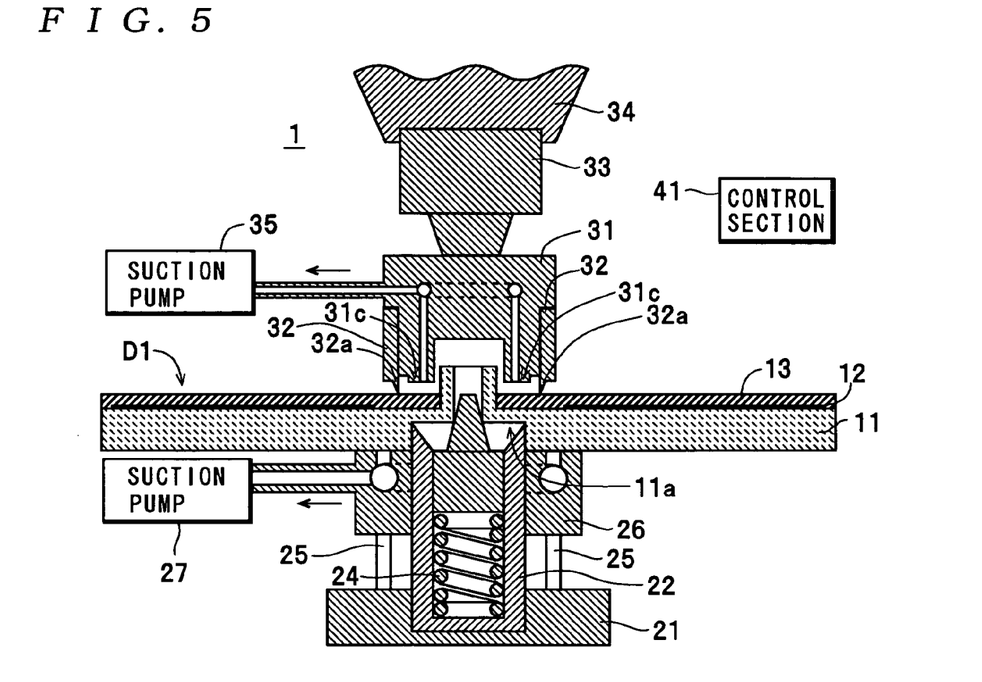
FIG. 5 is a cross-sectional view of the manufacturing apparatus and the disk-shaped substrate in a state where a blade of a cut-forming blade section is brought into abutment with the surface of the light transmission layer.

Next, when the disk-shaped substrate D1 is moved further downward by the moving mechanism 34, the spring 24 is further compressed and the positioning protrusion 23 causes the center of the disk-shaped substrate D1 to be aligned with (positioned with respect to) the center of the punching blade section 22. In this state, as shown in FIG. 5, the lower surface (around the recess 11a) of the disk-shaped substrate D1 is brought into intimate surface contact with the upper surface of the substrate-receiving table 26, whereby the disk-shaped substrate D1 is held by the substrate-receiving table 26. Then, when the disk-shaped substrate D1 is moved further downward, the substrate-receiving table 26 is moved downward together with the disk-shaped substrate D1 such that the air cylinders 25, 25, . . . are compressed, whereby the cutting edge of the punching blade section 22 enters the recess 11a of the disk-shaped substrate D1. At this time, the air cylinders 25, 25, . . . are uniformly compressed, so that the disk-shaped substrate D1 and the substrate-receiving table 26 are moved downward in parallel with each other (perform downward translating motion). Further, since the outer diameter (e.g. 15.04 mm) of the punching blade section 22 is slightly smaller than the inner diameter (e.g. 15.06 mm) of the recess 11a, the punching blade section 22 is moved upward relative to the disk-shaped substrate D1 without rubbing the outer peripheral surface thereof against the inner wall surface of the recess 11a. Subsequently, the control section 41 causes the ultrasonic generator 33 to generate ultrasonic waves, and at the same time, causes the moving mechanism 34 to move the ultrasonic horn 31 further downward. In doing this, the ultrasonic waves generated by the ultrasonic generator 33 are transmitted to the blade 32a of the cut-forming blade section 32 via the ultrasonic horn 31, to thereby cause vertical ultrasonic vibration of the blade 32a.

Figure 6:
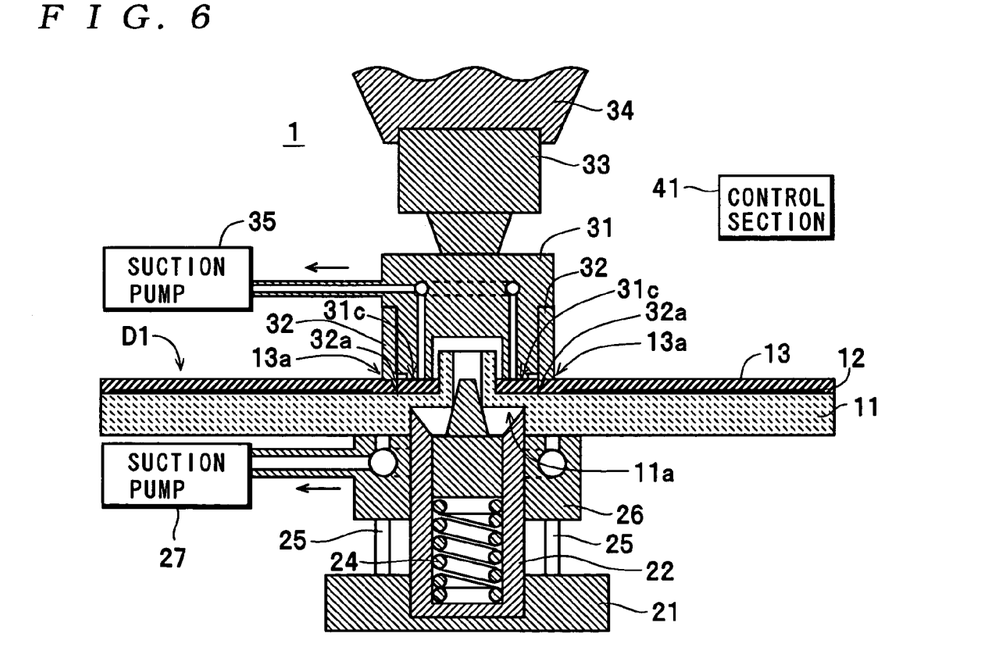
FIG. 6 is a cross-sectional view of the manufacturing apparatus and the disk-shaped substrate in a state where the blade is pushed into the light transmission layer.

Then, when the ultrasonic horn 31 is moved further downward by the moving mechanism 34, as shown in FIG. 6, the blade 32a is pushed into the light transmission layer 13. In this case, since the blade 32a is configured to protrude downward from the lower end face 31c of the ultrasonic horn 31 to a length equivalent or approximately equal to the thickness of the light transmission layer 13, when the blade 32a is pushed into the light transmission layer 13 until the lower end face 31c of the ultrasonic horn 31 reaches the surface of the light transmission layer 13, the cutting edge of the blade 32a reaches the surface of the substrate 11. As a result, as shown in FIG. 6, a circular cut 13a which has a diameter approximately equal to the diameter (16 mm in the present example) of the blade 32a and has a depth approximately equal to the thickness of the light transmission layer 13, is formed in the light transmission layer 13. In this case, a portion of the light transmission layer 13 in contact with the blade 32a is softened due to heat generated by vertical ultrasonic vibration of the blade 32a, so that the blade 32a is smoothly pushed into the light transmission layer 13. As a result, the wear of the cutting edge of the blade 32a is reduced.

Figure 10:
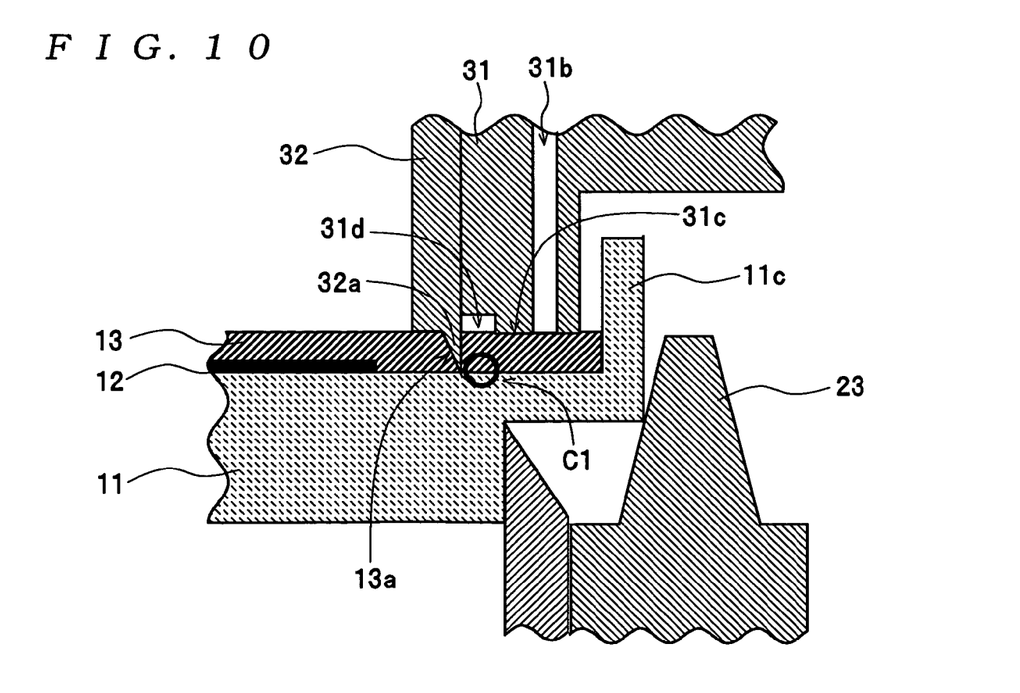
FIG. 10 is a cross-sectional view of the blade and components associated therewith in a state where the blade is pushed into the light transmission layer.

Next, the control section 41 causes the moving mechanism 34 to move the ultrasonic horn 31 further downward while maintaining the state of the blade 32a being pushed into the light transmission layer 13 and causing the ultrasonic generator 33 to generate ultrasonic waves, whereby the downward motion of the disk-shaped substrate D1 is continued. During the continued downward motion of the substrate D1, the ultrasonic waves generated by the ultrasonic generator 33 are transmitted via the lower end face 31c of the ultrasonic horn 31 and the foremost end of the cut-forming blade section 32, to the disk-shaped substrate D1 to cause the ultrasonic vibration thereof. This causes portions of the light transmission layer 13 around the lower end face 31c of the ultrasonic horn 31 and the foremost end of the cut-forming blade section 32 to be softened due to heat generated by the ultrasonic vibration, and adhered to (be brought into intimate contact with) the substrate 11. In this case, as shown in FIG. 10, a portion (surrounded by a circle C1 in FIG. 10) of the light transmission layer 13 opposed to the cutaway portion 31d of the ultrasonic horn 31 does not receive direct transmission of the ultrasonic waves, so that this portion maintains a state not adhering to the substrate 11.

Figure 7:
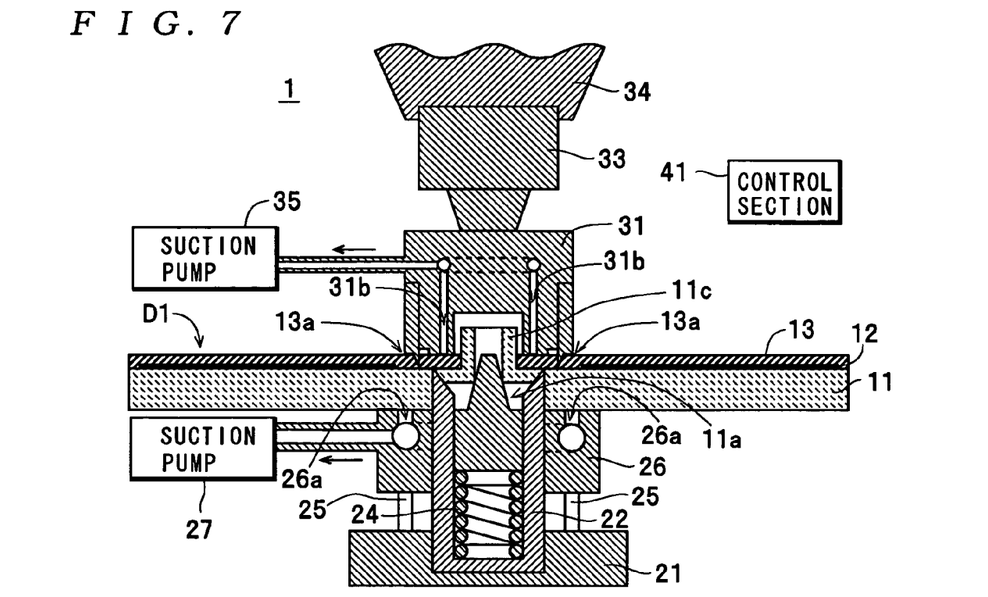
FIG. 7 is a cross-sectional view of the manufacturing apparatus and the disk-shaped substrate in a state where a punching blade section is pushed into the substrate.

Next, the disk-shaped substrate D1 is moved further downward, whereby as shown in FIG. 7, the cutting edge of the punching blade section 22 is pushed into the substrate 11. In doing this, since the ultrasonic waves transmitted via the ultrasonic horn 31 cause the disk-shaped substrate D1 to continue to undergo vertical ultrasonic vibration, a portion of the substrate 11 in contact with the cutting edge of the punching blade section 22 is softened due to heat generated by the ultrasonic vibrations, so that the cutting edge of the punching blade section 22 is smoothly pushed into the substrate 11. As a result, the wear of the cutting edge of the punching blade section 22 is sufficiently reduced. Further, since the substrate 11 has the recess 11a formed therein in advance during preparation thereof, it is possible to form the central hole 14 by punching only a portion having a far smaller thickness compared with the case of punching a substrate without the recess 11a.

Next, the control section 41 causes the moving mechanism 34 to stop the downward motion of the ultrasonic horn 31 when the cutting edge of the punching blade section 22 reaches the upper surface of the substrate 11 (reverse surface of the light transmission layer 13), and causes the ultrasonic generator 33 to stop generation of ultrasonic waves. Then, the control section 41 causes the suction pump 35 to operate for sucking air between the front surface (around the protrusion 11c) of the disk-shaped substrate D1 and the underside surface of the ultrasonic horn 31 through the suction holes 31b, 31b, . . . and the control section 41 causes the suction pump 27 to operate for sucking air between the underside surface (around the recess 11a) of the disk-shaped substrate D1 and the front surface of the substrate-receiving table 26 through the suction holes 26a, 26a, . . . As a result, the punched piece CH (see FIG. 8) punched off by the punching blade section 22 is sucked or attracted by the ultrasonic horn 31, and the disk-shaped substrate D1 is sucked or attracted by the substrate-receiving table 26. Then, the control section 41 causes the moving mechanism 34 to move the ultrasonic generator 33 and the ultrasonic horn 31 upward. At this time, the air cylinders 25, 25, . . . are extended along with the upward motion of the ultrasonic horn 31, whereby the substrate-receiving table 26 and the disk-shaped substrate D1 are moved upward. The spring 24 is progressively expanded to move the positioning protrusion 23 upward.

Figure 11:
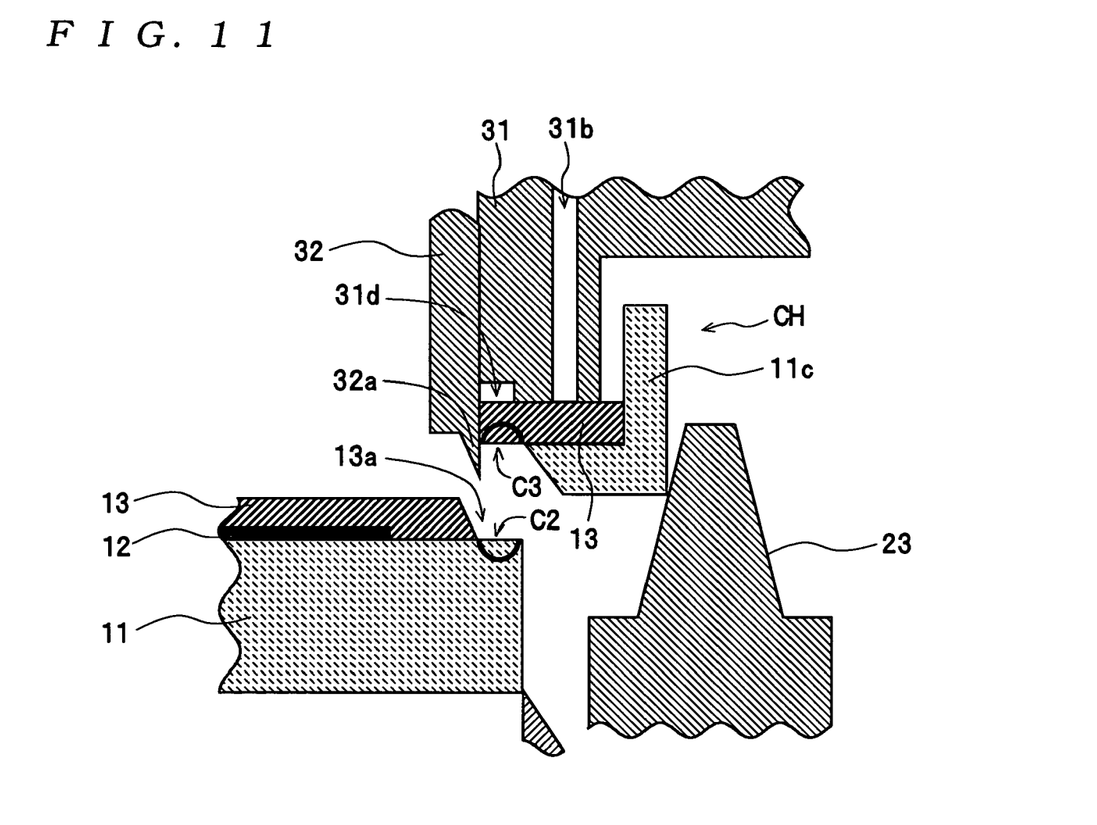
FIG. 11 is a cross-sectional view of the blade and components associated therewith in a state where the ultrasonic horn is moved upward.

Further, when the ultrasonic horn 31 is moved further upward to fully extend the air cylinders 25, 25, . . . , as shown in FIG. 8, the punched piece CH sucked to the ultrasonic horn 31 is separated from the disk-shaped substrate D1 (substrate 11) and moved upward together with the ultrasonic horn 31. At this time, the spring 24 is progressively expanded to move the positioning protrusion 23 upward, whereby separation of the punched piece CH from the disk-shaped substrate D1 is assisted. Further, since the disk-shaped substrate D1 is sucked and held at the substrate-receiving table 26, it is possible to avoid the inconvenience that the disk-shaped substrate D1 is moved upward together with the punched piece CH. In this case, as shown in FIG. 11, portions of the substrate 11 and the light transmission layer 13 opposed to the cutaway portion 31d of the ultrasonic horn 31 (surrounded respectively by semi-circles C2 and C3 in FIG. 11) do not adhere to each other, so that this portion of the light transmission layer 13 is clearly peeled off the substrate 11 when the punched piece CH is separated off. On the other hand, portions of the light transmission layer 13 and the substrate 11 outward of the cut 13a adhere to each other, so that the separation of the light transmission layer 13 from the substrate 11, which could occur after the central hole 14 is formed, is reliably prevented. Thus, formation of the central hole 14 through the disk-shaped substrate D1 is completed to complete the optical recording medium D2. Then, the control section 41 causes the suction pumps 27 and 35 to stop operation, whereby the attraction of the optical recording medium D2 to the substrate-receiving table 26 and the attraction of the punched piece CH to the ultrasonic horn 31 are stopped. Subsequently, the punched piece CH is collected and the completed optical recording medium D2 is carried out from the substrate-receiving table 26.

As described hereinabove, according to the manufacturing apparatus 1, a cut 13a is formed by pushing the cut-forming blade section 32 into the light transmission layer 13, while causing ultrasonic vibration of the cut-forming blade section 32, and the punching blade section 22 is pushed into the disk-shaped substrate D1, while maintaining ultrasonic vibrating state of the ultrasonic horn 31 and the pushed-in state of the cut-forming blade section 32, whereby a central hole 14 is punched. This makes it possible to soften a portion of the light transmission layer 13 in contact with the blade 32a during formation of the cut 13a the light transmission layer 13 by heat generated by the ultrasonic vibration. Therefore, the blade 32a can be smoothly pushed into the light transmission layer 13, whereby it is possible to sufficiently reduce the wear of the blade 32a. As a result, even when the cut-forming blade section 32 is used over the long term, it is possible to reliably form a cut 13a having a sufficient depth.

Further, during punching of the central hole 14 through the substrate 11, ultrasonic waves can be transmitted to the disk-shaped substrate D1 by way of the ultrasonic horn 31. Therefore, a portion of the substrate 11 in contact with the punching blade section 22 can be softened by heat generated by the ultrasonic vibration, which enable the punching blade section 22 to be smoothly pushed into the substrate 11. As a result, the wear of the punching blade section 22 can be sufficiently reduced. Further, the punching blade section 22 and the cut-forming blade section 32 can be smoothly pushed by one ultrasonic generator 33 without providing expensive ultrasonic generators separately for the two blade sections 22 and 32, which makes it possible to sufficiently reduce the wear of the two blade sections 22 and 32 without increasing the component costs of the manufacturing apparatus 1. Further, when the blade 32a of the cut-forming blade section 32 is pushed into the light transmission layer 13, part of the light transmission layer 13 and part of the substrate 11 outward of the cut 13a can be caused to adhere to each other, which makes it possible to reliably prevent this part of the light transmission layer 13 from peeling off the substrate 11 after formation of the central hole 14.

Further, according to this manufacturing apparatus 1, the cutaway portion 31d circular in plan view is formed at the outer periphery of the lower end face 31c of the ultrasonic horn 31, whereby when the blade 32a of the cut-forming blade section 32 is pushed into the light transmission layer 13, it is possible to maintain the portions of the light transmission layer 13 and the substrate 11 opposed to the cutaway portion 31d in the state not adhering to each other. This enables this portion of the light transmission layer 13 to clearly peel of the substrate 11, when the punched piece CH is separated off.

Further, according to this manufacturing apparatus 1, the moving mechanism 34 causes the ultrasonic horn 31 to move in the approaching direction toward the cutting edge of the punching blade section 22 whereby the positioning protrusion 23 fitted in the positioning hole 11b of the disk-shaped substrate D1 to be moved in the approaching direction together with the disk-shaped substrate D1, thereby causing the punching blade section 22 to be pushed into the disk-shaped substrate D1, whereby the disk-shaped substrate D1 can be brought into abutment with the punching blade section 22 with the center of the disk-shaped substrate D1 and that of the punching blade section 22 being aligned. This makes it possible to prevent the central hole 14 from being formed off-center.

Further, according to this manufacturing apparatus 1, the moving mechanism 34 causes the ultrasonic horn 31 to move in the approaching direction toward the cutting edge of the punching blade section 22 whereby the substrate-receiving table 26 is caused to be moved with the disk-shaped substrate D1, thereby causing the punching blade section 22 to be pushed into the disk-shaped substrate D1. Therefore, when the cutting edge of the punching blade section 22 is normally, i.e. except during punching operation, not protruded from the surface where the disk-shaped substrate D1 is brought into contact, which makes it possible to prevent an operator from being injured by an accidental or careless touch of his hand on the cutting edge of the punching blade section 22, and prevent the punching blade section 22 from being broken owing to contact with other tools. Further, the substrate-receiving table 26 is capable of causing e.g. the translating motion of the disk-shaped substrate D1, whereby it is possible to prevent the disk-shaped substrate D1 from being inclined when the central hole 14 is punched. This makes it possible to form the central hole 14 which is perpendicular to the horizontal surface of the disk-shaped substrate D1.

Further, according to this manufacturing apparatus 1, suction holes 26a, 26a, . . . , are formed through the substrate-receiving table 26 for sucking and holding the disk-shaped substrate D1, and at the same time, suction holes 31b, 31b, . . . , are formed through the ultrasonic horn 31 for sucking and holding the punched piece CH, whereby it is possible to prevent the optical recording medium D2 from being moved in accordance with the upward motion of the ultrasonic horn 31 when the punched piece CH is separated off the disk-shaped substrate D1.

Further, according to this manufacturing apparatus 1, the ultrasonic generator 33 causes longitudinal ultrasonic vibration of the ultrasonic horn 31. Therefore, differently from the construction in which the ultrasonic horn 31 is subjected to simple harmonic vibration horizontally or along the plane of the disk-shaped substrate D1, neither the cut-forming blade section 32 nor the disk-shaped substrate D1 is horizontally displaced (vibrated), so that it is possible to form a cut 13a and punch a central 14, with the center of the disk-shaped substrate D1, that of the cut-forming blade section 32, and that of the punching blade section 22 being aligned. This makes it possible to reliably prevent the cut 13a and the central hole 14 from being formed off-center.

It should be noted that the present invention is by no means limited to the aforementioned embodiment. For example, although in the above embodiment, the blade 32a of the cut-forming blade section 32 is formed to have a height (105 μm) equivalent to the thickness (100 μm) of the light transmission layer 13, this is not limitative, but if the blade 32a is formed to have a height (e.g. approximately 120 μm) slightly larger than the thickness of the light transmission layer 13, it is possible to form a cut 13a in a manner such that the cutting edge of the blade 32a is pushed into the substrate 11. This makes it possible to cut the light transmission layer 13 more reliably, whereby it is possible to reliably avoid the inconvenience that a portion of the light transmission layer 13 which should be punched off together with the substrate 11 in forming the central hole 14 is left around the periphery of the central hole 14. Further, it is also possible to integrally form the ultrasonic horn 31 and the cut-forming blade section 32. In this case, it is preferable that in place of the cutaway portion 31*d*, a groove which is circular in plan view is formed in the lower end face 31*c* of the ultrasonic horn 31 at a location inward of the location of the cut-forming blade section 32 (blade 22*a*).

Further, although in the above-described embodiment, the ultrasonic generator 33 causes the longitudinal vibration of the ultrasonic horn 31, this is not limitative, but, for example, the ultrasonic horn 31 may be caused to perform torsional vibration (angular vibration) by setting the central axis of the ultrasonic horn 31 (i.e. central axis of the cut-forming blade section 32) to the axis of vibration. Furthermore, although in the above-described embodiment, the punched piece CH is attracted to the ultrasonic horn 31, but the construction of the punched piece-holding device in the present invention is not limited to this, but the punched piece CH may be held by gripping the protrusion 11*c*.

Further, although in the present embodiment, the punching blade section 22 is pushed into the substrate 11 by causing the moving mechanism 34 to move the disk-shaped substrate D1 downward, this is not limitative, but the manufacturing apparatus 1 may be configured such that a dedicated moving mechanism is provided for the motion of the punching blade section 22, whereby when a central hole 14 is punched, the dedicated moving mechanism is caused to move the punching blade section 22 to push the punching blade section 22 into the substrate 11. Further, in the above-described embodiment of the present invention, the substrate-receiving table 26 is mounted on the base 21 via the air cylinders 25, the second urging device in the present invention is not limited to this, but it is possible to employ any other suitable urging device, such as hydraulic cylinders, as desired.

What is claimed is:

1. An optical recording medium-manufacturing apparatus, comprising:
   an abutment section including a cut-forming blade section that has a hollow cylindrical shape and is pushed into a resin layer formed on one side of a disk-shaped substrate, thereby forming a circular cut in the resin layer;
   a punching blade section including a cutting edge that is pushed into the disk-shaped substrate, for punching a central hole smaller in diameter than the circular cut, through the disk-shaped substrate;
   a moving mechanism that moves said abutment section in directions toward and away from said cutting edge of said punching blade section;
   a control section that controls motion of said abutment section caused by said moving mechanism; and
   an ultrasonic generator that causes ultrasonic vibration of said abutment section,
   wherein said control section causes said moving mechanism to move said abutment section while causing said ultrasonic generator to cause ultrasonic vibration of said abutment section, in an approaching direction toward said cutting edge of said punching blade section, to thereby cause said cut-forming blade section to be pushed into the resin layer to form the circular cut, and while maintaining a state of the ultrasonic vibration of said abutment section and a pushed-in state of said cut-forming blade section, cause said punching blade section to be pushed into the disk-shaped substrate from the other side of the disk-shaped substrate to form the central hole.

2. An optical recording medium-manufacturing apparatus as claimed in claim 1, wherein said abutment section has an indentation circular in plan view formed in a surface thereof which is brought into contact with the resin layer when said cut-forming blade section is in the pushed-in state, at a location inward of a location where said cut-forming blade section is arranged.

3. An optical recording medium-manufacturing apparatus as claimed in claim 1, including a positioning protrusion disposed in a central portion of said punching blade section in a state slidable in the directions toward and away from said cutting edge of said punching blade section, and a first urging device urging said positioning protrusion toward said abutment section, and
   wherein said positioning protrusion has a foremost end thereof protruded toward said abutment section with respect to said cutting edge of said punching blade section, and is capable of being fitted in a positioning hole formed in a central portion of the disk-shaped substrate, and
   wherein said moving mechanism causes said abutment section to move in the approaching direction, thereby causing said positioning protrusion fitted in the positioning hole to move together with the disk-shaped substrate in the approaching direction, to cause said punching blade section to be pushed into the disk-shaped substrate.

4. An optical recording medium-manufacturing apparatus as claimed in claim 1, including a substrate-receiving table having an insertion hole formed in a central portion thereof, for inserting said punching blade section, and a second urging device that urges said substrate-receiving table toward said abutment section such that normally, a surface of said substrate-receiving table for being brought into contact with the disk-shaped substrate is positioned toward said abutment section with respect to said cutting edge of said punching blade section, and
   wherein said moving mechanism causes said abutment section to move in the approaching direction to cause said substrate-receiving table to move in the approaching direction together with the disk-shaped substrate, thereby causing said punching blade section to be pushed into the disk-shaped substrate, and
   wherein said substrate-receiving table allows the disk-shaped substrate to move in the approaching direction when the disk-shaped substrate is pressed by said moving mechanism.

5. An optical recording medium-manufacturing apparatus as claimed in claim 1, including a substrate-holding device that attracts a part of the disk-shaped substrate outward of a location where the central hole is to be formed to hold the disk-shaped substrate thereat, and a punched piece-holding device that holds a punched piece which has been punched off by said punching blade section.

6. An optical recording medium-manufacturing apparatus as claimed in claim 1, wherein said ultrasonic generator causes longitudinal vibration of said abutment section.

* * * * *